INVENTORS.
Andrew Herczog
Richard S. Humphries
BY Walter S. Zebrowski
ATTORNEY

INVENTORS.
Andrew Herczog.
Richard S. Humphries
BY Walter S. Zebrowski
ATTORNEY

United States Patent Office 3,551,196

Patented Dec. 29, 1970

3,551,196

ELECTRICAL CONTACT TERMINATIONS FOR SEMICONDUCTORS AND METHOD OF MAKING THE SAME

Andrew Herczog, Painted Post, and Richard Shenk Humphries, Corning, N.Y., assignors to Corning Glass Works, Corning, N.Y., a corporation of New York Filed Jan. 4, 1968, Ser. No. 695,643
Int. Cl. H01l *5/06;* C23c *13/00*
U.S. Cl. 117—212 22 Claims

ABSTRACT OF THE DISCLOSURE

A semiconductor contact termination providing low resistance electrical contact to semiconductor active regions and protecting them from degradation caused by the penetration of contact material at high temperatures is disclosed.

A first layer of a transition metal sub-oxide is deposited on the surface of the semiconductor. A second layer of a metal having an electrical conductivity higher than the first layer is then deposited over the transition metal suboxide.

BACKGROUND OF THE INVENTION

One of the difficulties that has frequently been encountered in subjecting solid state devices and circuitry to high temperature processes and environmental conditions has been the resulting penetration of materials from the terminal contact layers thereof into the underlying semiconductor active regions. Alloying and diffusion of such materials in the active regions of semiconductors occurs readily at temperatures in excess of about 600° C. and results in the substantial degradation of semiconductor electrical properties.

Because of this problem semiconductors have been hermetically encapsulated in polymeric materials which can be applied at relatively low temperatures, or in sealed metal containers. Unfortunately, in many cases, polymeric encapsulants do not provide mechanical bonds with semiconductive materials sufficient to protect the latter from attack by moisture and other environmental impurities for extended periods of time. The use of metal containers greatly increases the size of miniature solid state components thereby contributing substantially to a reduction in volumetric efficiency. In addition, metal containers are costly in comparison with the cost of other types of encapsulating materials. Further, the fabrication of semiconductors in metal containers requires a separate operation on each individual unit whereas encapsulating materials such as polymers, glass, and the like can be applied by batch type methods thus permitting encapsulation of large numbers of individual devices simultaneously.

The low cost and high quality of hermetric seals resulting from glass encapsulation of non-solid state electrical devices has been demonstrated. However, glass encapsulation of semi-conductors has not been possible because of contamination which occur at the high temperatures to which such devices are necessarily subjected during the glazing process.

We have discovered a method of providing low resistance electrical terminals for semiconductors which prevents the alloying and diffusion of contact materials into the semiconductor active regions at higher temperatures than have heretofore been possible, namely temperatures in excess of about 600° C. Consequently, by the method of our invention, semiconductors of either the discrete type or the integrated microcircuit type may be adequately protected against degradation while being encapsulated in glass or while being subjected to other high temperature processes or conditions for similar short periods of time.

BRIEF DESCRIPTION

It is therefore an object of the instant invention to provide a method for protecting the active regions of semiconductor devices from degradation caused by the penetration of terminal contact material therein during high temperature conditions to which such devices may be subjected.

It is a further object of the instant invention to protect semiconductor materials from alloying and diffusion with terminal contact materials at higher temperatures than have heretofore been possible.

Briefly, in accordance with the instant invention, an electrical termination for the surface of an active region of a semiconductor is provided by depositing a first layer consisting essentially of a transition metal sub oxide on the surface, and thereafter depositing a second layer, consisting essentially of a highly conductive metal, on the first layer. The first layer prevents portions of the conductive metal of the second layer from penetrating into the semiconductor active region so as to degrade its semiconductive properties under temporary high temperature conditions nad processes to which the semiconductor might be subjected. Sub oxides of transition metals are employed in the first layer due to the fact that the resistivity of such materials is substantially lower than that of ordinary transition metallic oxides. Low resistance electrical contact between the conductive metal of the second layer and the surface of the semiconductive active region is obtained by making the transition metal sub oxide layer sufficiently thin.

Additional objects, features, and advantages of the instant invention will become apparent to those skilled in the art from the following detailed description and attached drawings, on which, by way of example, only the preferred embodiment of the instant invention is described.

DESCRIPTION OF THE PREFERRED EMBODIMENT

Figure 1:
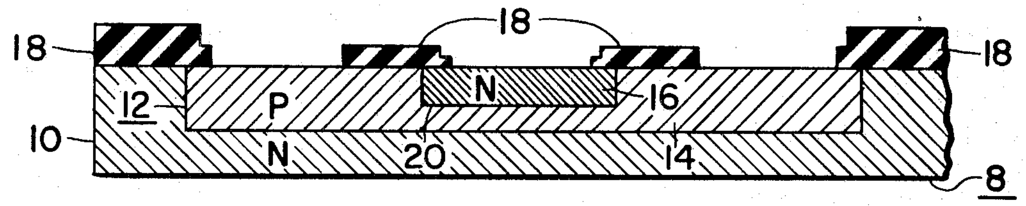
FIG. 1 shows a cross-sectional elevation of a portion of an integrated microcircuit wafer containing a p-n junction diode whose exposed surfaces are to be terminated in accordance with the method of the instant invention.

Referring to FIGS. 1 through 9 there is shown, in a portion of an integrated microcircuit 8, a monocrystalline substrate 10, e.g. silicon, germanium, gallium arsenide, or the like, and a junction diode 12 consisting of a pair of diffused semiconductive regions 14 and 16 having p-type and n-type conductivity, respectively. Other portions of the microcircuit 8, not shown, may contain other groups of semiconductive regions, each group of which define separate and distinct circuit elements such as transistors, resistors, capacitors, rectifiers, and the like. Such circuit elements are likewise adaptable to the instant invention in the same manner and to the same extent as hereinafter described with reference to the junction diode 12.

As will readily be understood by one skilled in the art, the junction diode 12 of the instant example is obtainable by growing or depositing a suitable passivation layer 18, such as silicon dioxide, on the surface of a monocrystalline substrate 10, and thereafter removing portions, e.g. acid etching methods, in order to expose surface areas of the substrate 10 where the semiconductive regions 14 and 15 are to be formed. The region 14 is formed within a portion of the substrate 10 by conventional methods such as by diffusing boron into a silicon substrate, gallium into a germanium substrate, or the like in such manner as to form an active semiconductive region having p-type conductivity. Thereafter the surface of the substrate 10 is re-oxydized followed by etching away a portion thereof over which a second active region 16 is to be formed. The region 16 is formed within a portion of the region 14 by diffusing therein an n-type impurity such as phosphorous or antimony. Accordingly, a thin pan-shaped rectifying junction 20 is formed between the active semiconductive regions 14 and 16. The exposed surface portions of the semiconductive regions 14 and 16 provide areas for making electrical connections between the diode 12 and other parts of the microcircuit 8, not shown, and/or other electrical elements external to the microcircuit 8.

Figure 2:
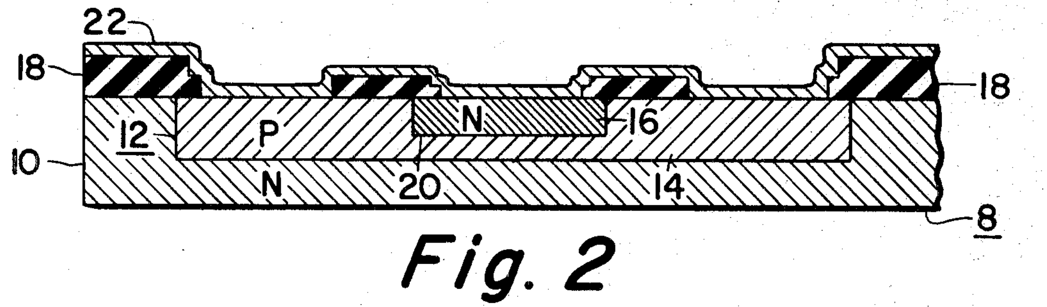
FIGS. 2–9 show the steps in terminating the semiconductive surfaces of the p-n junction diode contained in the microcircuit of FIG. 1 illustrating an embodiment of the instant invention.

Electrical contact terminations are made to the diode 12 contained in the silicon substrate 10 by preparing the exposed surfaces of the regions 14 and 16 in such manner as to provide low resistance electrical contact to the semiconductive surfaces and to protect the semiconductor surfaces from penetration by conductive materials during conditions of high temperature such as those occurring during a glass encapsulation process. Referring to FIG. 2 a thin transition metal sub oxide layer 22, such as TiO, VO, $V_2O$, MnO, FeO, NiO, CoO, or the like, is uniformly deposited on the surface of the microcircuit 8 of FIG. 1 by any suitable manner well known in the art. Sub oxides of the transition metals are used because they are of generally lower resistivity than their normal oxide counterparts, e.g. titanium dioxide, etc., and are chemically nonreactive with the surfaces of the semiconductor active regions 14 and 16. The thickness of the layer 22 is sufficient to protect the regions 14 and 16 from penetration by impurities. However, since the semiconductive layer 22 has a substantial value of resistivity, it is not deposited to an excessive thickness. A titanium monoxide layer 22 having a thickness of about 1,000 A. is sufficiently thin to provide low ohmic resistance through its cross-section while adequately protecting the active regions 14 and 16 against contact metal penetration. Titanium monoxide may be deposited on the surface of the substrate 10 by conventional vacuum deposition methods. For example, a titanium monoxide layer 22 about 1,000 A. in thickness is obtained by evaporating about 35 milligrams of 99.9% pure titanium monoxide particles from a tungsten boat in a bell jar or vacuum chamber which is evacuated to a pressure of $10^{-7}$ torr, and permitting the vapor to condense on the surface of the substrate 10 suspended within the chamber at a distance of about 15 cm. from the tungsten boat.

Figure 3:
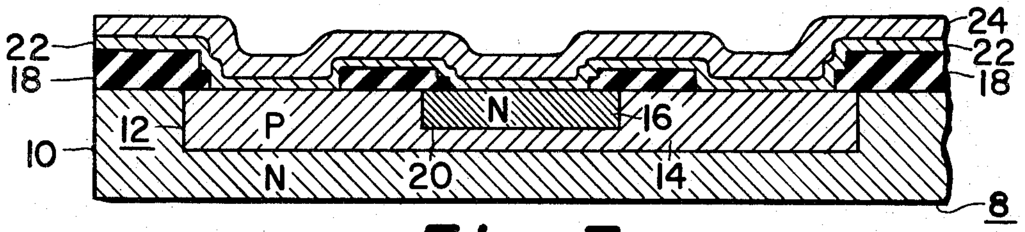

Referring to FIG. 3, a conductive layer 24 having high electrical conductivity such as silver, aluminum, copper, or the like is uniformly applied to the surface of the semiconductive layer 22. The material comprising the conductive layer 24 must not have the ability to diffuse through the titanium monoxide layer 22 at high temperatures so as to penetrate the underlying active regions 14 and 16. Also, the conductive layer 24 should be of sufficient thickness to afford suitable low resistance paths between electrically connected terminations and to permit the bonding of terminal lead wires thereto, at points where such connections are to be made, without damaging the underlying titanium monoxide layer 22 in the process. A conductive layer 24 consisting of silver and having a thickness of about 5,000 A. provides sufficient material for terminal lead wire bonding and may be deposited upon the surface of the titanium monoxide layer 22 in any suitable manner well known in the art, such as by conventional vacuum deposition. Using vacuum deposition, a 5,000 A. thick silver layer 24 is uniformly deposited upon the microcircuit 8 following the vacuum deposition of the layer 22. To accomplish this a strip or supply of 99.999% pure silver meighing about 600 milligrams is evaporated from a tantalum filament onto the layer 22 from a distance of about 10 cm.

Figure 4:
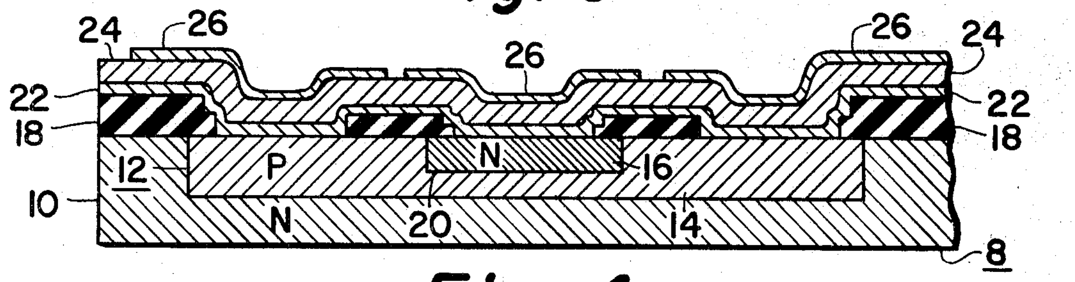

Thereafter the conductive layer 24 is prepared for selective removal by coating its surface with a layer of photosensitive material, followed by masking the material against exposure to light over those portions of the conductive layer 24 to be removed. The unmasked portions of the material are then exposed to light. The preparation is completed by immersing the microcircuit 8 in a conventional photoresist developer solution and thereafter removing portions of the material previously unexposed to light in a conventional manner. FIG. 4 shows a layer 26 of photosensitive material such as Kodak Thin Film Resist after removal of portions thereof as described above.

Figure 5:
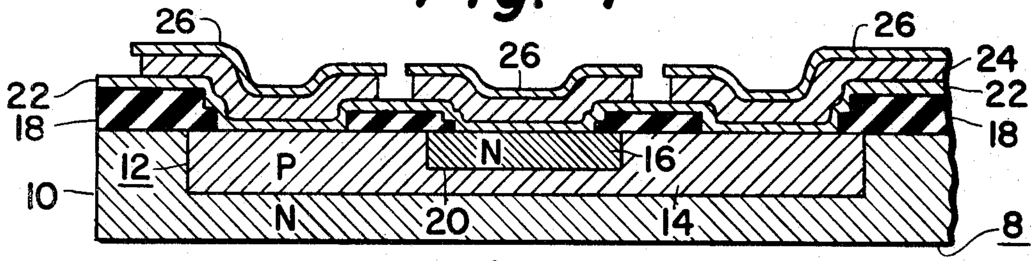

Referring to FIG. 5, portions of the conductive layer 24 are removed by immersing the microcircuit 8 in a suitable silver etching solution such as 0.1 percent chromic-sulfuric acid at a temperature of 70° C. The portions of the conductive layer 24 removed are those portions which are unprotected from the etching solution by the photosensitive material of the layer 26.

Figure 6:
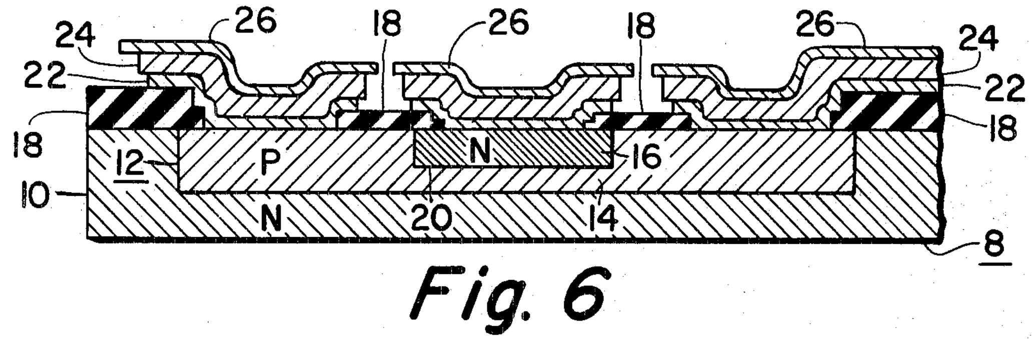
Figure 7:
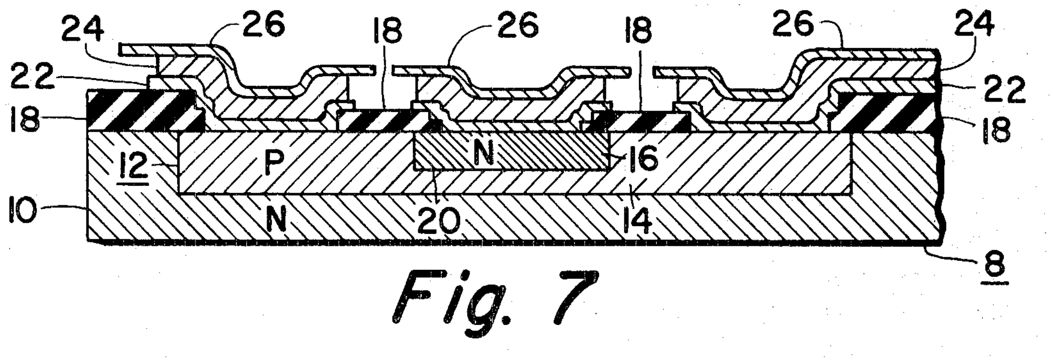

Referring to FIG. 6, the titanium monoxide layer 22 is divided in conformity with the division previously made in the overlying silver layer 24. This is accomplished by immersing the microcircuit 8 in a suitable titanium monoxide etching solution such as 10 percent hydrofluoric acid. It will be noted that, due to undercutting as a result of the etching of the titanium monoxide layer 22, a small border of the silver layer 24 overlays the border of the layer 22. To insure complete separation of the conductive layer 24 from the passivation layer 18 and the semiconductive regions 14 and 16, the border of the conductive layer 24 is undercut by a second acid etch of the silver. By etching the silver layer 24 a second time, a small portion of the titanium monoxide layer 22 is caused to protrude around the border of the overlying silver conductive layer 24 as shown in FIG. 7.

Figure 8:
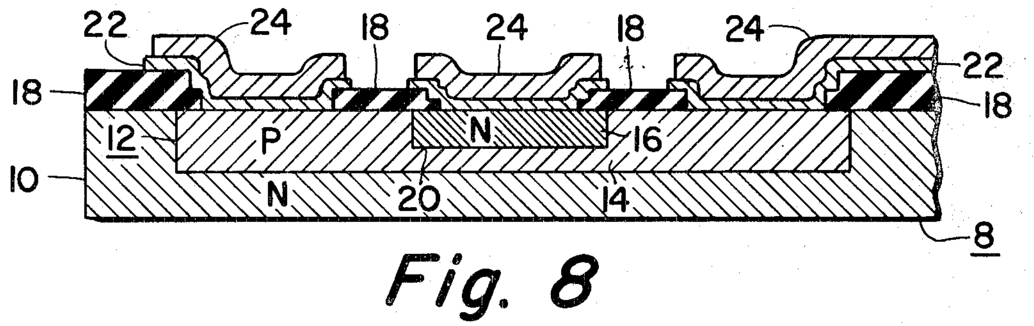

The remaining portions of the photoresist layer 26 are removed by immersing the microcircuit 8 in any suitable and well-known photoresistive film removal agent. FIG. 8 shows the microcircuit 8 after the layer 26 has been removed. A list of photosensitive removal agents suitable for use in the instant invention is provided in the publication, Kodak Photosensitive Resists for Industry, Kodak Publication No. P–7, 1962, a copy of which is obtainable from the Sales Service Division, Eastman Kodak Company, Rochester, N.Y. The patterned layers 22 and 24 are thereby formed in such a way as to permit external electrical connections to be made to the diode 12 or to provide electrical leads upon the passivation layer 18 for electrical connection of the diode 12 to other parts of the microcircuit 8.

Figure 9:
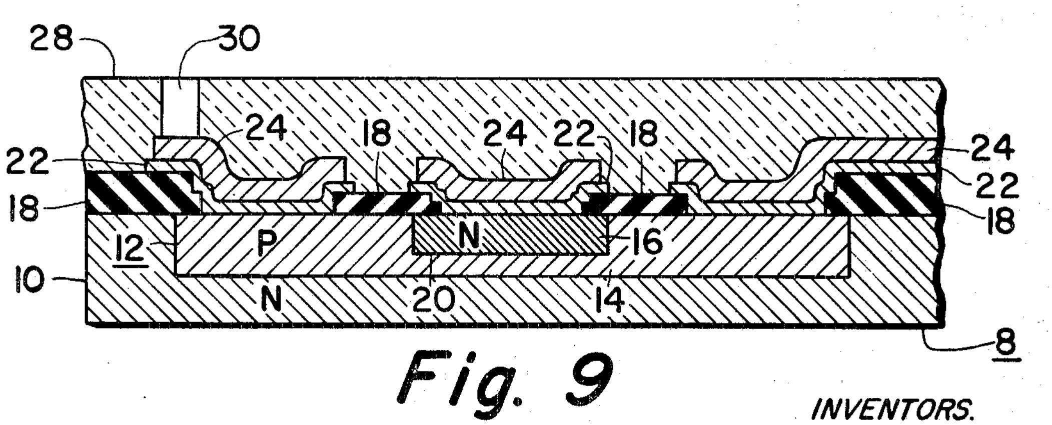

The microcircuit 8 is encapsulated in any suitable encapsulating materials 28 such as glass, polymeric material, or the like by any well-known method in such manner as to form a hermetically sealed integrated microcircuit as shown in FIG. 9. For example, glass may be sputtered onto the microcircuit 8 from a glass cathode under low pressure conditions in a vacuum chamber. Thereafter, the glass deposited on the microcircuit 8 is fired in an oven to produce consolidation of the glass and provide hermetic sealing. A titanium monoxide layer 22 of 1,000 A. thickness is sufficient to protect the semiconductive diffusion regions 14 and 16 from penetration by silver from the conductive layer 24 during a firing process which employs a heating schedule of 750° C. for a duration of 15 minutes. The silver conductive layer 24 having a thickness of 5,000 A. is sufficiently thick to permit a lead wire to be bonded thereto by any suitable method well known in the art such as thermal compression bonding, ultrasonic bonding, bonding to electrically conductive pillors, or the like without causing damage to the underlying titanium monoxide layer 22. The hole 30 in the glass 28 illustrates one point through which such a lead wire may connect to the conductive layer 24.

Although the instant invention has been described with respect to specific details of a particular embodiment thereof, it is not intended that such details be limitations upon the scope of the invention except insofar as set forth in the following claims.

We claim:

1. A method of making an electrical termination for the surface of an active region of a semiconductor, the steps of which comprise disposing a first layer consisting essentially of a transition metal sub oxide on said surface, said first layer being adapted to prevent electrically conductive metals from diffusing therethrough so as to penetrate said surface, and disposing a second layer consisting essentially of a metal having high electrical conductivity on said first layer, said second layer being adapted to make low resistance electrical contact with said surface through said first layer.

2. The method of claim 1, the steps of which further comprise depositing said first and second layers by the process of vacuum evaporation.

3. The method of claim 1 wherein said first layer consists essentially of titanium monoxide.

4. The method of claim 1 wherein said second layer consists of a material selected from the group consisting of silver, aluminum, and copper.

5. The method of claim 1 wherein said first layer is about 1,000 A. in thickness.

6. The method of claim 1 wherein said second layer is about 5,000 A. in thickness.

7. A method of making an electrical termination for a surface of an active region of a semiconductor, the steps of which comprise depositing a first layer consisting essentially of a transition metal sub oxide on the surface of said semiconductor, depositing a second layer consisting essentially of a metal having high electrical conductivity on said first layer, masking portions of said second layer in conformity with the surface of said region to be terminated, with an acid resistant mask in such manner as to prevent the exposure of the masked portions of said second layer to an acid etching solution into which said semiconductor is to be immersed, immersing said semiconductor in an acid etching solution to remove the unmasked portions of said second layer, immersing said semiconductor in another acid etching solution to remove portions of said first layer underlying said unmasked portions, and thereafter removing said mask.

8. The method of claim 7, the steps of which further comprise depositing said first and second layers by the process of vacuum evaporation.

9. The method of claim 7 wherein said first layer consists essentially of titanium monoxide.

10. The method of claim 7 wherein said second layer consists of a material selected from the group consisting of silver, aluminum, and copper.

11. The method of claim 7 wherein said first layer is about 1,000 A. in thickness.

12. The method of claim 7 wherein said second layer is about 5,000 A. in thickness.

13. An electrical termination for a surface of an active region of a semiconductor comprising a first layer consisting essentially of a transition metal sub oxide disposed on said surface, a second layer consisting essentially of a metal having high electrical conductivity disposed on said first layer, said second layer adapted to make low resistance electrical contact with said surface.

14. The termination of claim 13 wherein said first layer consists essentially of titanium monoxide.

15. The termination of claim 13 wherein said second layer consists of a material selected from the group consisting of silver, aluminum, and copper.

16. The termination of claim 13 wherein said first layer is about 1,000 A. in thickness.

17. The termination of claim 13 wherein said second layer is about 5,000 A. in thickness.

18. The termination of claim 13 wherein said first layer consists esentially of titanium monoxide and said second layer consists of a material selected from the group consisting of silver, aluminum, and copper.

19. The termination of claim 13 wherein said first layer has a thickness of about 1000 A. and said second layer has a thickness of about 5000 A.

20. A method of making an electrical termination for an active region of a semiconductor comprising the steps of disposing a first layer consisting essentially of a transition metal sub oxide on the surface of said semiconductor, depositing a second layer consisting essentially of a metal having a high electrical conductivity on said first layer, said second layer being adapted to make low resistance electrical contact with said surface through said first layer, removing a portion of said second layer, and removing at least a portion of said first layer exposed by the removal of said second layer, whereby at least a portion of said first and second layers form an electrical termination for said active region of said semiconductor.

21. The method of claim 20 wherein said first layer consists essentially of titanium monoxide and said second layer consists of a material selected from the group consisting of silver, aluminum, and copper.

22. The method of claim 21 wherein said first layer has a thickness of about 1000 A. units and said second layer has a thickness of about 5000 A. units.

References Cited

UNITED STATES PATENTS 3,341,753 9/1967 Cunningham et al. ---- 317—234
3,437,527 4/1969 Webb -------------- 317—234
3,457,470 7/1969 Meuleman.

ALFRED L. LEAVITT, Primary Examiner

A. GRIMALDI, Assistant Examiner

U.S. Cl. X.R.

29—578; 117—217; 156—17; 317—234